United States Patent [19]

Ferreira et al.

[11] Patent Number: 5,523,635
[45] Date of Patent: Jun. 4, 1996

[54] SWITCHED RELUCTANCE STARTER/GENERATOR

[75] Inventors: Caio A. Ferreira; Craig R. Legros, both of Rockford, Ill.

[73] Assignee: Sundstrand Corporation, Rockford, Ill.

[21] Appl. No.: 457,564

[22] Filed: Jun. 1, 1995

Related U.S. Application Data

[62] Division of Ser. No. 230,276, Apr. 20, 1994, Pat. No. 5,489,810.

[51] Int. Cl.$^6$ .............................. H02K 11/00; H02K 3/22
[52] U.S. Cl. .................................................. 310/71; 310/54
[58] Field of Search ................................. 310/53, 54, 71; 439/178, 179, 190, 191, 192, 194, 195, 196, 926

[56] References Cited

U.S. PATENT DOCUMENTS

| | | | |
|---|---|---|---|
| 2,683,227 | 7/1954 | Beckwith | 310/55 |
| 2,742,582 | 4/1956 | Bahn et al. | 310/52 |
| 3,510,700 | 5/1970 | Grinchenko et al. | 310/54 |
| 4,140,934 | 2/1979 | Jager et al. | 310/71 |
| 4,866,316 | 9/1989 | Humphries et al. | 310/71 |

*Primary Examiner*—Clayton E. LaBalle
*Attorney, Agent, or Firm*—Jeffery J. Makeever

[57] ABSTRACT

A switched reluctance starter/generator is presented which has a stator mounted within a housing having an outer periphery and a plurality of salient poles defining an inner periphery, the salient poles further defining slots therebetween. A stator cooling sleeve is press fit on the outer periphery of the stator and defines a plurality of cooling channels between the outer periphery of the stator cooling sleeve and the housing. A plurality of phase windings are wound on the plurality of salient stator poles, and phase winding retainers are positioned within the slots for securing the phase windings on the salient stator poles. The winding retainers comprise a triangular base separator, a quasi-dovetailed retaining member, and two opposing wedge shaped expanders. A rotor assembly is rotatably positioned within the stator, and comprises a hollow shaft assembly and a rotor core having a plurality of salient poles press fit on the outer periphery of the shaft. The hollow shaft assembly comprises an outer sleeve and an inner cooling sleeve. The inner periphery of the inner cooling sleeve defines an interior void of the shaft. The outer periphery of the inner cooling sleeve is press fit on the inner periphery of the outer sleeve and defines a plurality of cooling channels between the inner periphery of the outer sleeve and the outer periphery of the inner cooling sleeve. The stator windings are wound from hollow core conductors, and are coupled to external sources of cooling fluid and electrical energy by electrical/hydraulic terminal connectors.

3 Claims, 10 Drawing Sheets

SWITCHED RELUCTANCE STARTER/GENERATOR

This invention was made with Government support under prime contract F33615-90-C-2052 awarded by the Department of Defense. The Government has certain rights in this invention.

This is a divisional of U.S. application Ser. No. 08/230,276, filed Apr. 20, 1994, now U.S. Pat. No. 5,489,810.

FIELD OF THE INVENTION

This invention relates to electrical generators, and more particularly to high speed switched reluctance generators capable of starting a prime mover as well as generating electrical power for use on aircraft.

BACKGROUND ART

The aerospace industry has consistently driven the leading edge of technology with its requirement for lightweight, high efficiency, high reliability equipment: lightweight because each additional pound of weight translates directly into increased fuel burn, and therefore, a higher cost of ownership and shorter range; high efficiency because each additional cubic inch required for equipment displaces the amount of revenue generating cargo and passengers that can be carried on an aircraft; high reliability because every minute of delay at the gate increases the cost of ownership, and likewise, increases passenger frustration. As equipment efficiency is driven to increase, and component size is driven to decrease, problems arise which must be overcome.

For the electric power generation systems for use on aircraft, these pressures have precipitated great advancements in technology, and have also precipitated problems which must be overcome before this new technology can be applied. Aircraft have typically used synchronous brushless AC generators or permanent magnet generators for their electric power generation needs. Unfortunately, both of these types of generators, which have been the workhorse of the aerospace electric power system, require components which often fail due to the harsh environment in which they are required to operate (usually mounted directly on the aircraft jet engine). The synchronous AC generators, for example, have rotating rectifiers which often fail due to the harsh environment; this decreases reliability. Both types of generators require some form of rotor containment due to the speed at which they operate; this increases weight. Additionally, both the brushless AC generators and the permanent magnet generators have stator coil windings which physically overlap, resulting in the potential damage of the wire insulation during the assembly process; this also decreases reliability.

In addition to an electrical generator, an engine starter is also typically installed on the aircraft engine. While this starter is important to start the engine, it becomes excess baggage during the remainder of the fight, increasing overall weight, increasing required fuel burn, increasing cost of ownership, and decreasing overall range. This problem has been recognized and efforts to combine the starter and generator into a single package, thus eliminating the need for an additional piece of equipment used only a fraction of a percent of the time, have proceeded. Unfortunately, using synchronous AC or permanent magnet generators for this purpose; in addition to creating new problems associated with the start function, does not eliminate the inherent problems with these machines as described above.

As a alternative to the use of the synchronous AC or the permanent magnet generator for this combined starter/generator function, a switched reluctance machine can be used. A switched reluctance machine is an inherently low cost machine, having a simple construction which is capable of very high speed operation, thus yielding a more lightweight design. The rotor of the switched reluctance machine is constructed from a simple stack of laminations making it very rugged and low cost. The rotor does not require rotating rectifiers, which are a large source of failures, as does the AC synchronous machine. As a further consequence of this simple rotor construction, the machine is capable of very high speed operation without the containment problems associated with rotor windings or permanent magnets.

Switched reluctance machines, however, require that careful design consideration be given to the cooling of the stator windings and the rotor structures themselves. The stator coil winding electrical losses consist of the DC $I^2R$. component, plus the eddy current components that are proportional to the electrical operating frequency. Because the switched reluctance machine is capable of operating at a very high speed, the frequency is thus very high, and therefore, the eddy current component is high. Furthermore, the magnetic field distribution of the stator coils is not uniform when the rotor pole is not aligned with the stator pole. The conductors near the air gap are exposed to higher magnetic flux density. The consequence of this is that the conductor adjacent to the stator pole has the highest power loss. Compounding the physical location of the coil windings, the winding configuration of the stator coils also results in less cross-sectional area for heat transfer through the stator laminations. Cooling of the stator windings, therefore, becomes a major problem with switched reluctance machines.

The rotor of a switched reluctance machine, as indicated above, is made simply from iron laminations which yield a robust configuration ideally suited for high speed applications. To ensure a robust mechanical design of the rotor, one must properly account for its electromagnetic losses. These rotor losses are a result of the non-sinusoidal flux distribution in the laminations. Eddy current and hysteresis losses amount to a substantial portion of those associated with the, rotor. Combined, these losses result in a temperature rise in the rotor laminations which tends to decrease the mechanical yield strength of the lamination material. This presents a substantial problem if not properly dealt with.

Others have attempted to solve these problems to allow efficient use of a switched reluctance machine as a combined starter/generator for an aircraft. One such system is disclosed by Stephen MacMinn and William Jones in a paper entitled "A Very High Speed Switched-Reluctance Starter-Generator For Aircraft Engine Applications," published as part of the proceedings of NAECON '89, National Aerospace Electronics Conference, May 22–26, 1989, Dayton, Oh. In the system presented therein, MacMinn attempts to address the cooling problem of the stator windings by flowing oil in non-magnetic cooling tubes placed at the top of the stator slots. Although this increases the cooling efficiency over strictly relying on heat transfer through the cross sectional area of contact with the stator poles, it does not efficiently remove heat from all of the windings. Those windings which do not touch the cooling tubes still must rely on heat transfer through the cross sectional area of contact with the stator poles or other windings. The rotor heat is removed by utilizing a hollow shaft through which oil is flowed. Although this effectively removes the heat from the rotor, it does so in a very inefficient manner. Heat is only removed by the oil which contacts the inside surface of the shaft. By flowing oil through the entire void of the shaft a majority of the oil serves no useful purpose, and in fact increases the system weight by requiring a higher volume of oil to be carried in the system.

SUMMARY OF THE INVENTION

It is the principle objective of the instant invention to provide a new and improved electric starter/generator. More specifically, it is the objective of the instant invention to provide a new and improved starter/generator utilizing an improved switched reluctance machine capable of high speed, harsh environmental operation while immunizing weight, and maximizing power density through the efficient cooling of the stator windings and the rotor while avoiding the problems associated with previous systems.

In accordance with the objectives of the instant invention, a switched reluctance starter/generator is presented which has a stator mounted within a housing having an outer periphery and a plurality of salient poles defining an inner periphery, the salient poles further defining slots therebetween. A stator cooling sleeve is press fit on the outer periphery of the stator and defines a plurality of cooling channels between the outer periphery of the stator cooling sleeve and the housing. A plurality of phase windings are wound on the plurality of salient stator poles, and phase winding retainers are positioned within the slots for securing the phase windings on the salient stator poles. A rotor assembly is rotatably positioned within the stator, and comprises a hollow shaft assembly and a rotor core having a plurality of salient poles press fit on the outer periphery of the shaft. The hollow shaft assembly comprises an outer sleeve and an inner cooling sleeve. The inner periphery of the inner cooling sleeve defines an interior void of the shaft. The outer periphery of the inner cooling sleeve is press fit on the inner periphery of the outer sleeve and defines a plurality of cooling channels between the inner periphery of the outer sleeve and the outer periphery of the inner cooling sleeve. Rotor end plates are also mounted on each axial end of the rotor core.

Further in accordance with the objectives of the instant invention, the switched reluctance starter/generator utilizes hollow core conductors, which enables coolant to be circulated therein to cool the windings. The electrical and hydraulic coupling through the housing is accomplished by a plurality of electrical/hydraulic terminal connectors which are coupled to the windings. These electrical/hydraulic terminal connectors provide the electrical coupling from the external source of electrical energy and the electrical distribution buses to the windings, as well as the hydraulic coupling from the external source of coolant to the hollow core of the windings. In addition, the terminal connectors must provide electric isolation between these couplings so that electric power is not transferred to the hydraulic lines and pumps inadvertently.

Also in accordance with the objectives of the instant invention, phase winding retainers are utilized to provide separation and retention of the phase windings on the salient stator poles. These retainers comprise a triangular base separator placed between the windings on adjacent stator poles at a radially outer periphery of the slot defined therebetween, a quasi-dove-tailed retaining member positioned at a radially inner periphery of the slot which caps the slot. The retaining member has two dove tailed wedge appendages which define an expansion slot therebetween. Two opposing wedge shaped expanders are axially driven into this expansion slot from opposing axial ends of the stator, thus horse-leathering the quasi-dovetailed wedge appendages against the windings to positively retain them within the slot.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
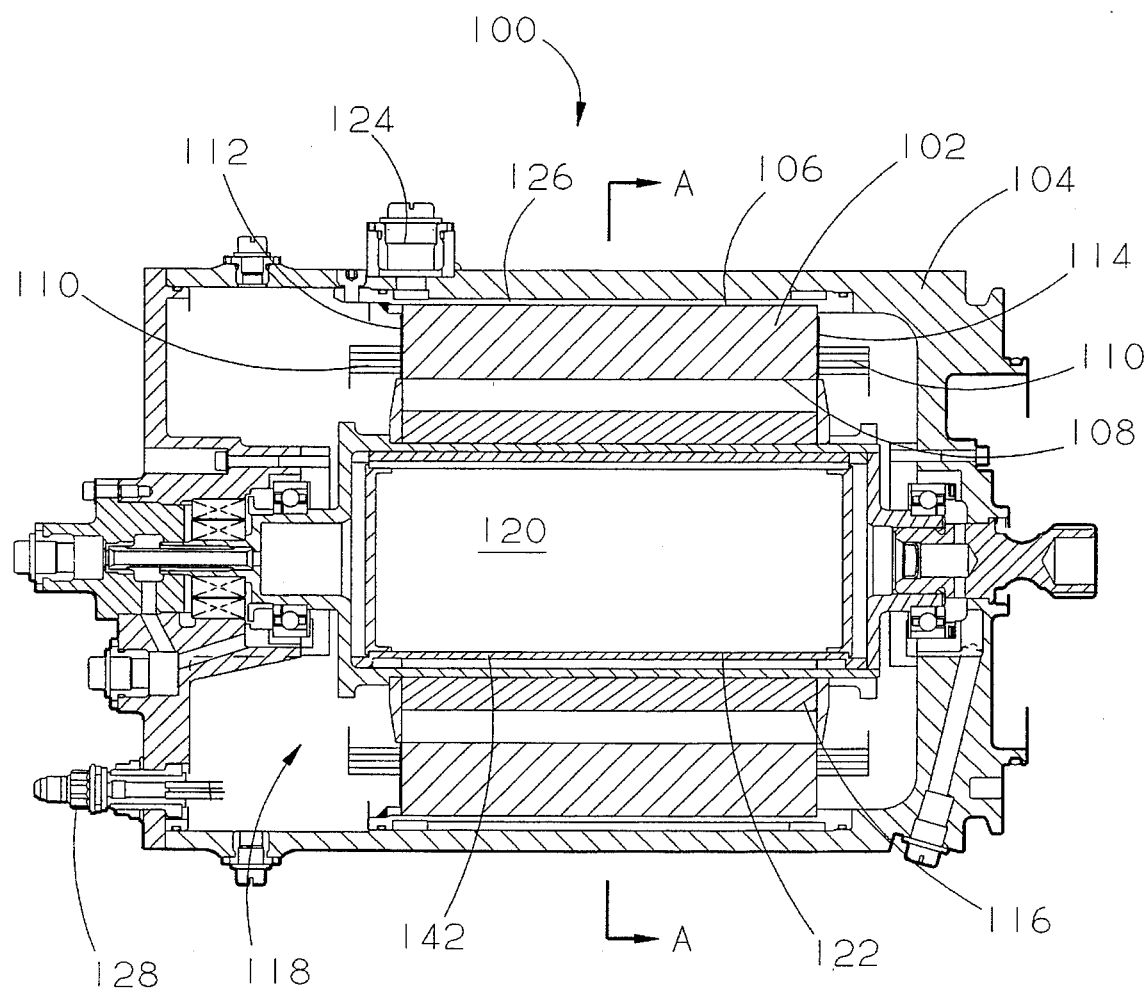
FIG. 1 is a mechanical schematic diagram of the switched reluctance starter/generator oft he instant invention.

FIG. 1 is a mechanical schematic diagram of the a switched reluctance starter/generator 100 of the instant invention. As shown therein, the starter/generator 100 has a stator 102 positioned within the housing 104. The stator 102 has an outer periphery 106 and an inner periphery 108. Stator phase windings 110 extend beyond each axial end 112, 114 of the stator 102. A rotor core 116 is positioned within the stator 102 and is driven by a shaft assembly 118 which is coupled to an external prime mover such as, For example, an aircraft engine or an auxiliary power unit (not shown). The shaft assembly 118 has a hollow core, hereinafter an interior void 120, as defined by the inner periphery 122 of inner cooling sleeve 142. As shown in FIG. 1, a hydraulic cooling port 124 penetrates the housing 104 to allow cooling fluid to flow within the cooling channels 126 which lie between the housing 104 and the outer periphery 106 of the stator 102.

Also as illustrated in FIG. 1, a preferred embodiment of the instant invention has an electrical/hydraulic terminal connector 128 which is provided to couple the phase windings 110 with an external source of electrical energy (not shown) as well as to an external source of hydraulic fluid (not shown).

Figure 2:
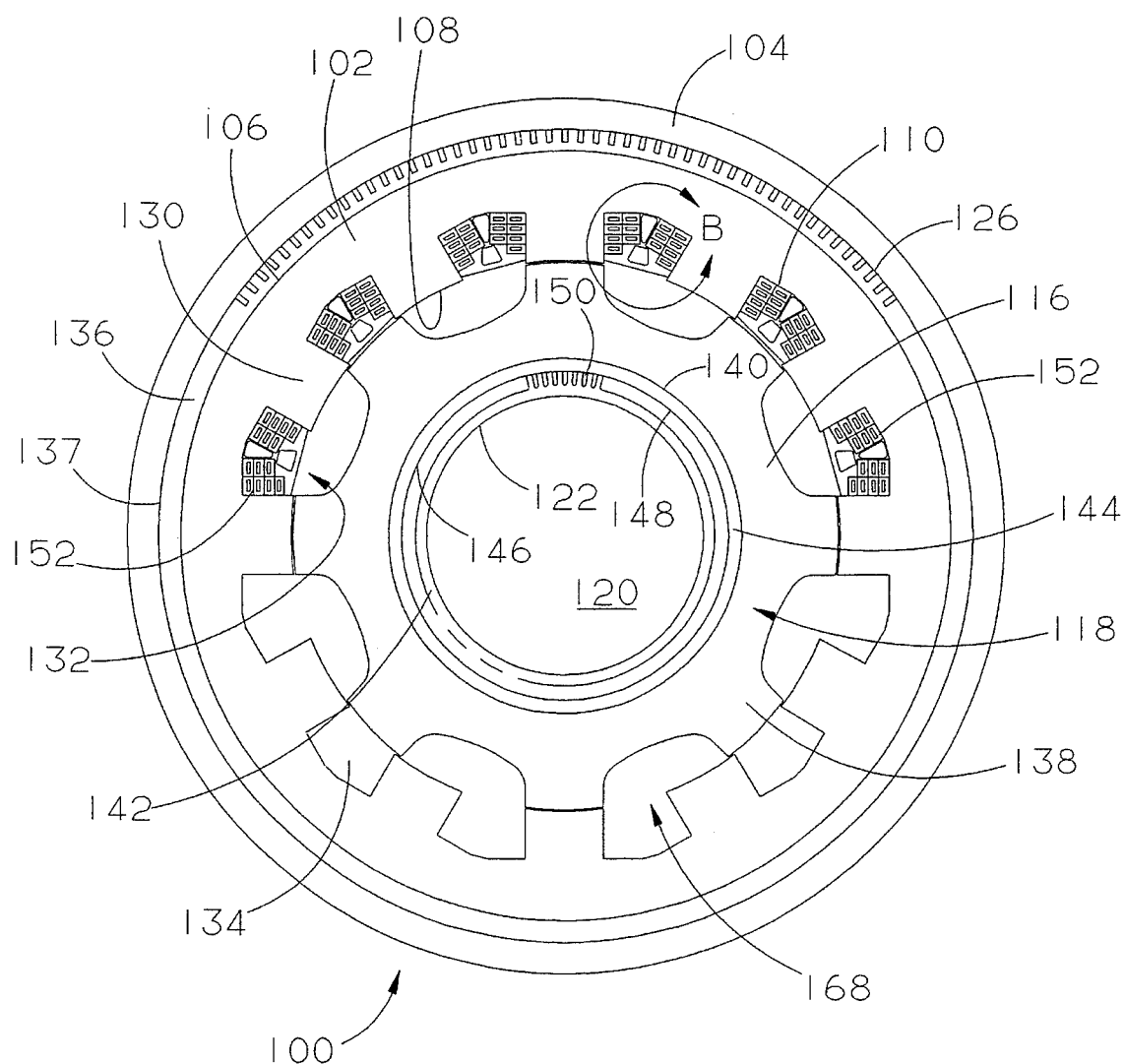
FIG. 2 is a mechanical cross section diagram of the switched reluctance starter/generator of the instant invention taken along line A—A of FIG. 1.

As shown in cross section in FIG. 2, the switched reluctance starter/generator 100 of the instant invention has a stator 102 mounted within a housing 104. The stator 102 has an outer periphery 106 and a plurality of salient poles 130 which defines an inner periphery 108. The stator salient poles 130 further defines slots 134 therebetween which house the stator windings 110 therein. In a preferred embodiment of the instant invention, twelve salient stator poles 130 are used. A stator cooling sleeve 136 is press fit on the outer periphery 106 of stator 102 and defines a plurality of cooling channels 125 between the outer periphery 137 of the stator cooling sleeve 136 and the housing 104. The plurality of phase windings 110 are wound on the plurality of salient stator poles 130 and winding retention means 132, such as is shown in more detail in FIG. 5, are positioned within the slots 134 for securing the phase windings 110 on the salient stator poles 130.

The rotor assembly 168 is rotatably positioned within the stator 102 and combines a hollow shaft assembly 118 and a rotor core 116 having a plurality of salient poles 138 press fit on the outer periphery 140 of the shaft assembly 118. In the preferred embodiment of the instant invention, eight salient rotor poles 138 are utilized. To maximize the power density of the starter/generator 100, the rotor core 116 is comprised of vanadium cobalt iron (2V49FeCo) laminations. The hollow shaft assembly 118 comprises an outer sleeve 144 and an inner cooling sleeve 142. The inner periphery 122 of the inner cooling sleeve 142 defines the interior void 120 of the shaft assembly 118. The outer periphery 146 of the inner cooling sleeve 142 is press fit on the inner periphery 148 of the outer sleeve 144 and defines a plurality of cooling channels 150 between the inner periphery 148 of the outer sleeve 144 and the outer periphery 146 of the inner cooling sleeve 142.

Figure 5:
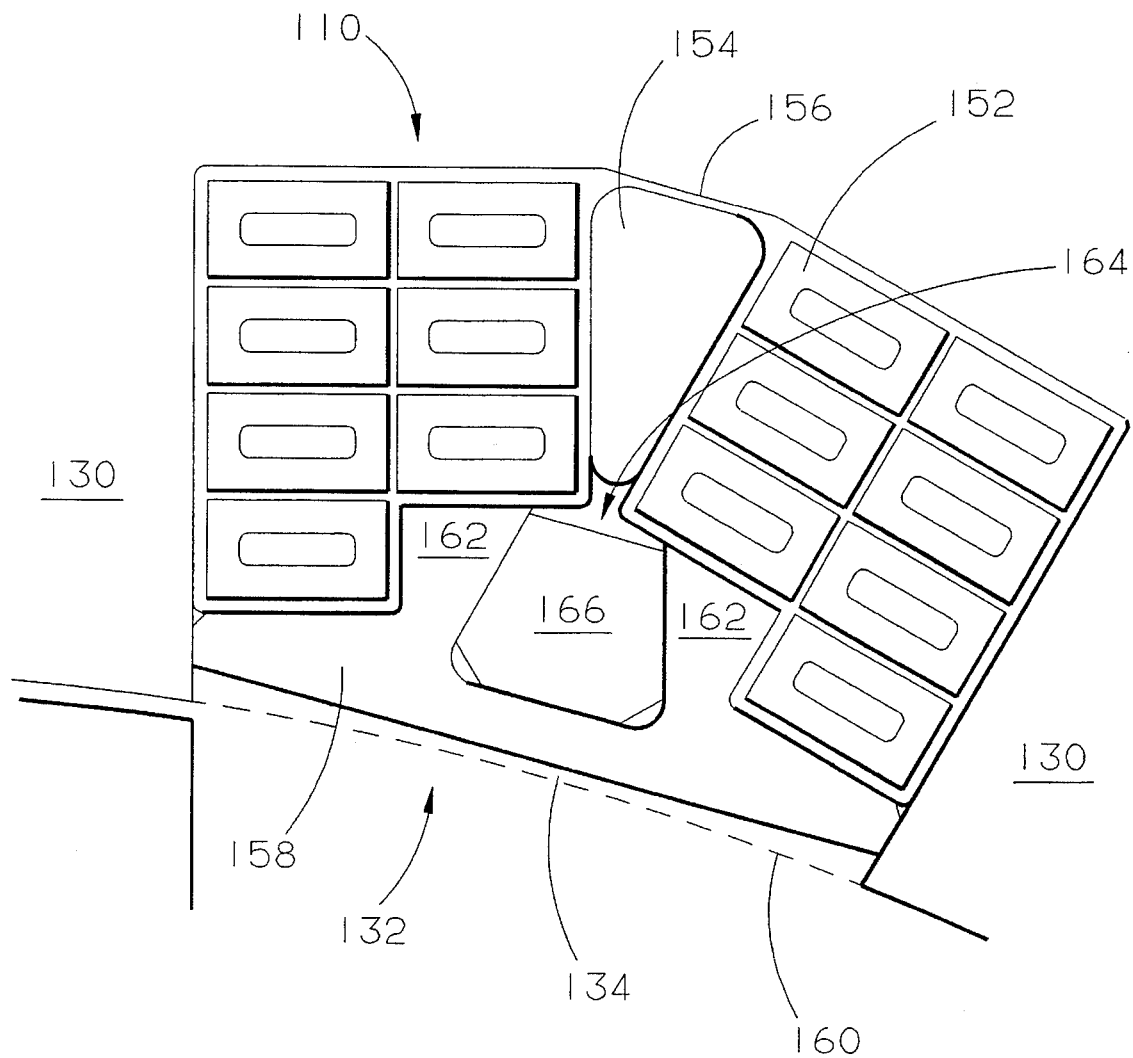
FIG. 5 is a diagrammatic view of the stator phase windings and winding retention means in the slot as indicated as section B of FIG. 2.

Further, in accordance with a preferred embodiment of the instant invention the stator windings 110 are wound from hollow core rectangular conductors 152 and are shown in more detail in FIG. 5. Preferably seven winding coil turns per stator pole are utilized although more or less may be utilized as deemed necessary. These hollow core conductors 152 enable coolant to be circulated within the windings 110 to cool them. In this way, uniform cooling of each stator winding is achieved. This has an advantage over other methods, such as that described by MacMinn, in that the conductors do not have to rely on their physical location for efficient cooling. The use of hollow core conductors 152 is permissible as the operating speed of the starter/generator 100 is typically very high. High speed equates to high frequency, a maximum of 2,963 Hertz in the preferred embodiment, which results in an electrical current skin depth in the conductor of only about 1.2 ram. Based on this knowledge, it becomes readily apparent that use of solid core conductors, such as used by MacMinn, adds weight which serves no purpose as no current flows within the conductor during high speed operation.

One problem associated with the use of hollow core conductors 152 is that at high operating temperatures (approximately 250° C. wall temperature), the sulfur impurities in the oil will react with the oil causing carbon deposits on the copper wall of the conductors 152. This could lead to clogging of the hollow core conductors 152, thereby casing thermal failure of the starter/generator 100. In the preferred embodiment of the instant invention this problem is overcome be depositing very thin layers of a metal which does not allow the deposition of carbon on the base metal of the interior wall of the conductor 152. Preferably metals in the family of nickel or chromium are used. In a highly preferred embodiment, a layer of electroless nickel (Ni) deposited to a thickness of between approximately two microns to four microns is used. In an alternate embodiment, the interior wall of the conductors 152 are coated with very thin layers of oxides.

Figure 3:
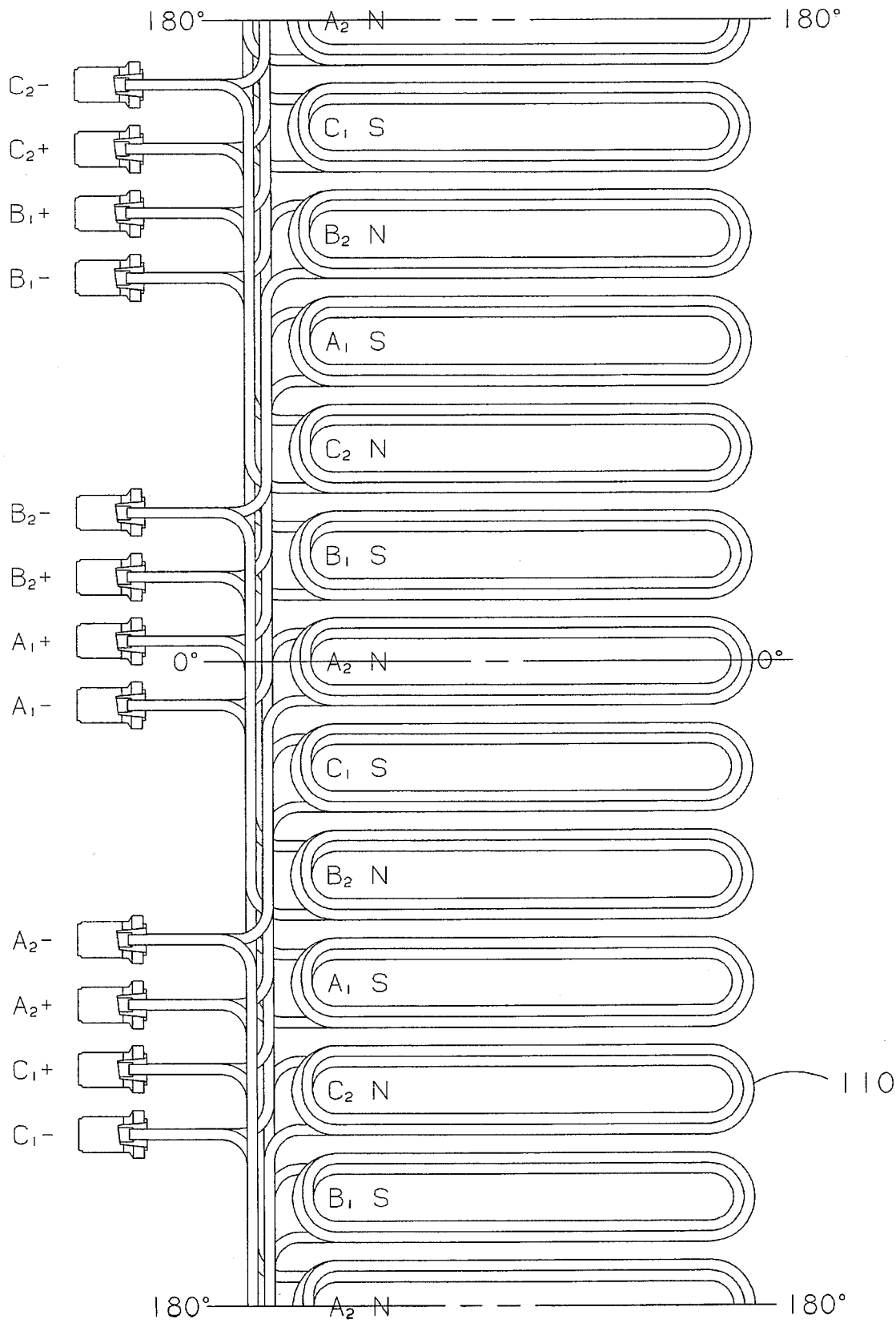
FIG. 3 is a rollout schematic diagram of the stator phase windings of the switched reluctance starter/generator of the instant invention.
Figure 4:
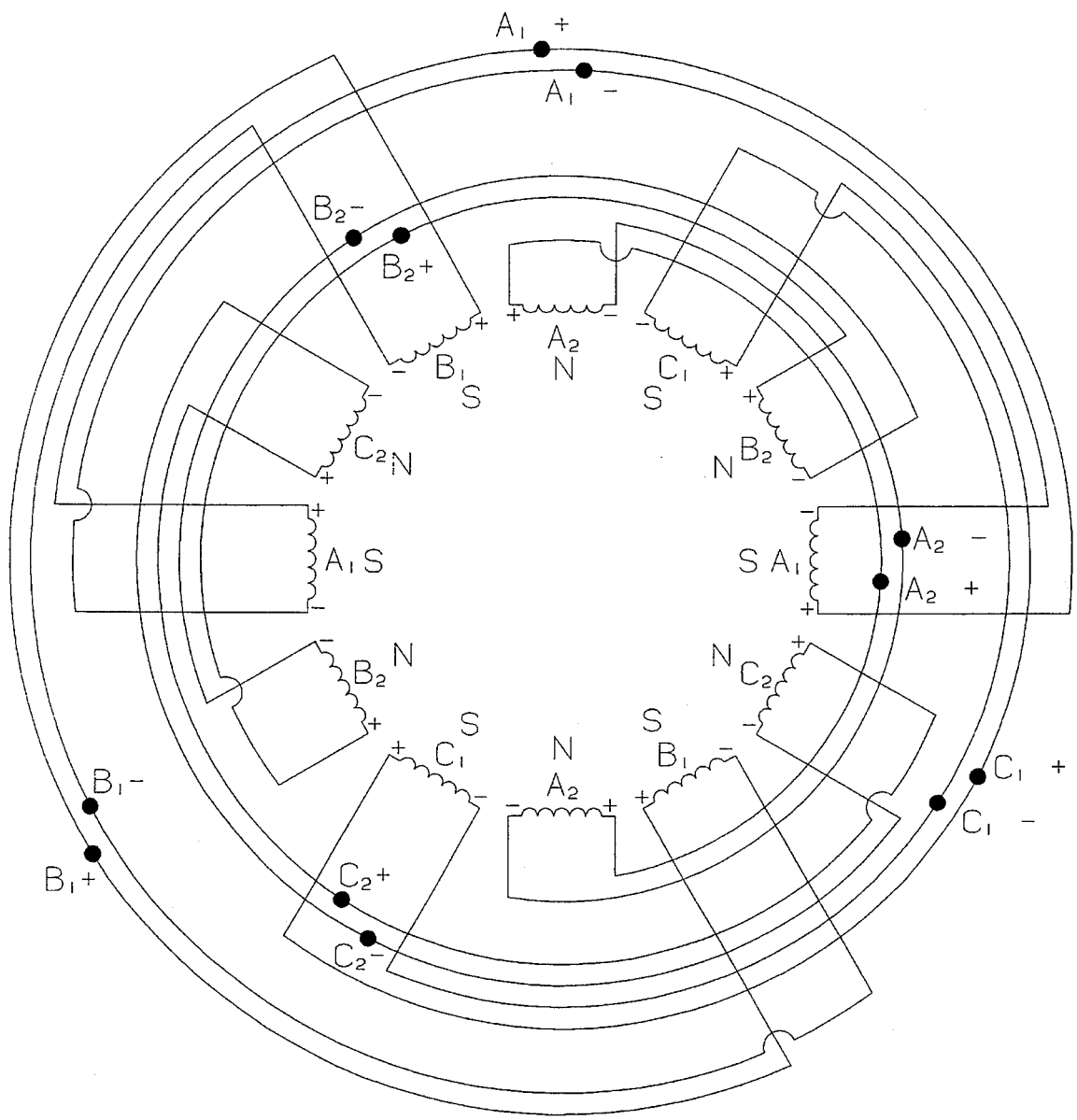
FIG. 4 is an relational physical layout electrical schematic diagram of the phase windings of the switched reluctance starter/generator of the instant invention.

Further, in accordance with a preferred embodiment oft he instant invention, the stator windings are wound using an S phase relationship as shown in FIG. 3. As can be seen from this figure, six phases, comprising two sets of three phase windings designated A1, B1, C1, and A2., B2, C2, are used in a preferred embodiment. As is recognized by one skilled in the art however, more or fewer phases can be utilized based on the principles described herein without departing from the spirit of the invention. The electrical schematic of a preferred embodiment for the instant invention is illustrated in FIG. 4, which shows a relational physical layout of the electrical schematic of the windings.

Figure 6:
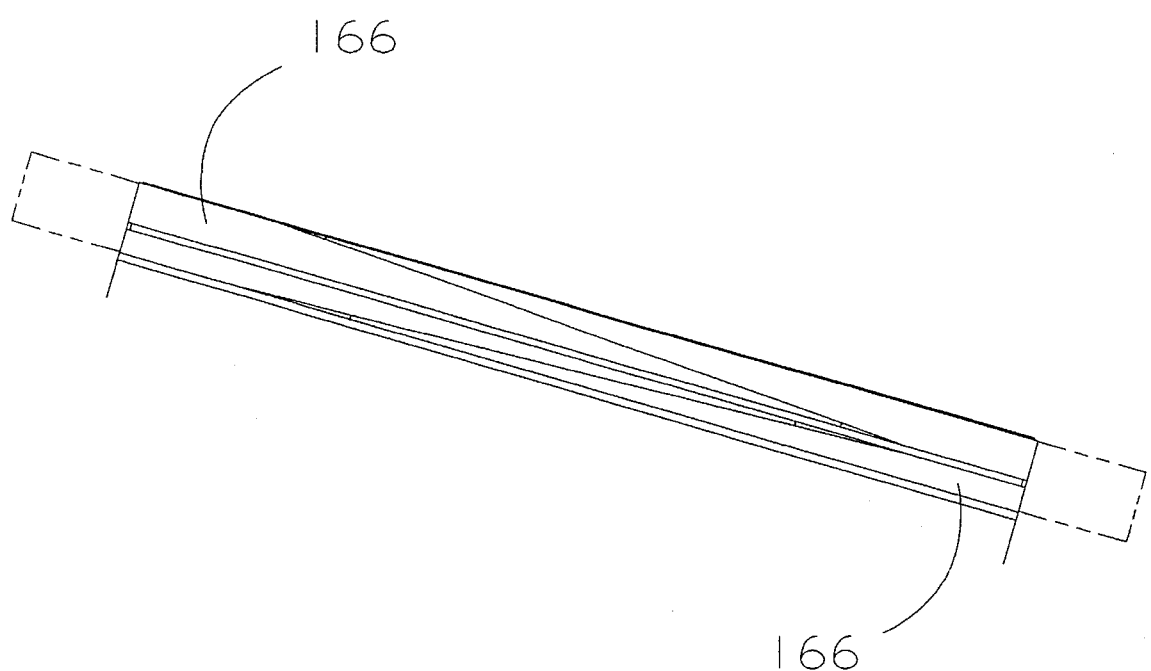
FIG. 6 is a diagram of the opposed wedged shaped expanders of the winding retention means.

As shown in greater detail in FIG. 5, the phase winding retention means 132 are utilized to ensure separation and retention of the phase windings 110 on the salient stator poles 130. The phase winding retention means 132 comprise a triangular base separator 154 placed between the windings 110 on adjacent stator poles 130 at a radially outer periphery 156 of the slot 134 defined therebetween, A quasi-dovetailed retaining member 158 is positioned at a radially inner periphery 160 of the slot 134 which caps the slot 134. The retaining member 158 has two dove-tailed wedge appendages 162 which define an expansion slot 164 therebetween. Two opposing wedge shaped expanders 166, as shown more clearly in FIG. 6, are axially driven into this expansion slot 164 from opposing axial ends 112, 114 (see FIG. 1) of the stator 102. This action horsefeathers the quasi dovetailed wedge appendages 162 against the windings 110 to retain them within the slot 134.

Figure 7:
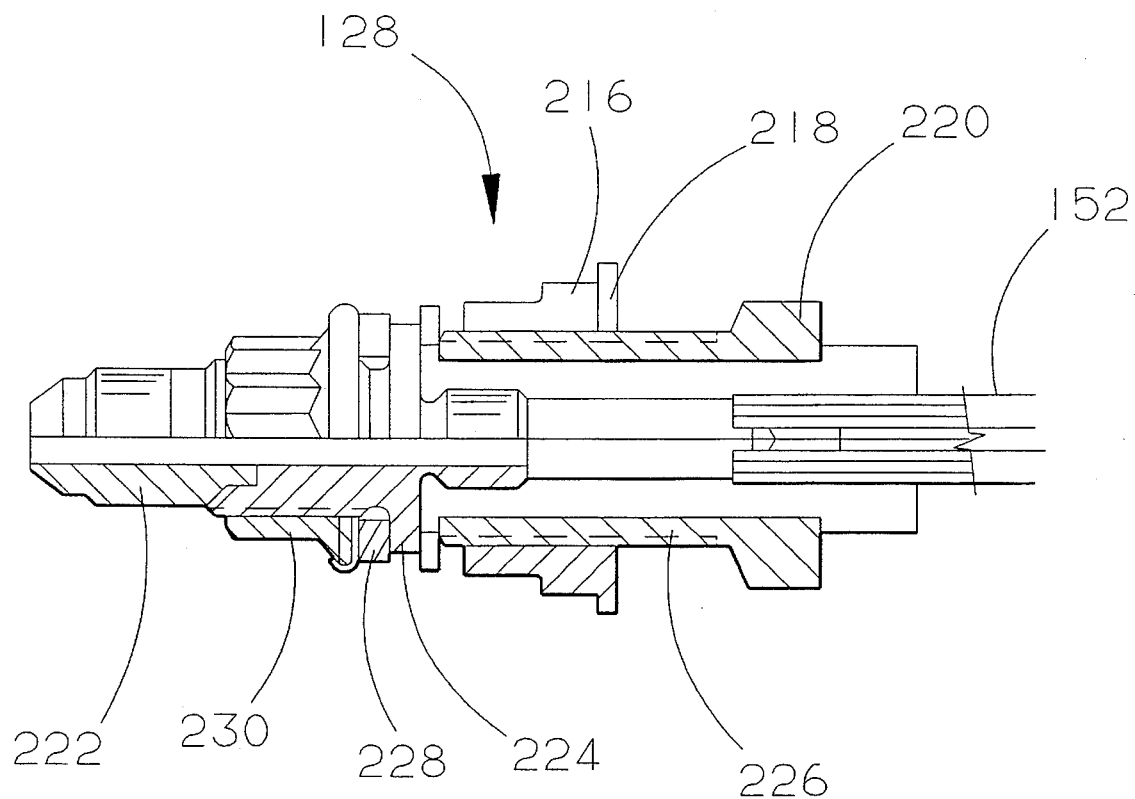
FIG. 7 is a mechanical schematic diagram of the electrical/hydraulic terminal connector of the instant invention.

Further, in accordance with the preferred embodiment of the instant invention, FIG. 7 illustrates in more detail an electrical/hydraulic terminal connector 128. The electrical/hydraulic terminal connector 128 couples the hollow core conductors 152 with an external source of electrical energy (not shown) as well as with an external source of hydraulic coolant (not shown). Further, the electrical/hydraulic terminal connectors 128 provide electric isolation between the electrical and hydraulic coupling by the coupling nose cone 222. Electrical isolation from the housing 104 is provided by the housing isolation sheath 220, isolation spacer 218, and isolation collar 216. In a highly preferred embodiment, an insulating material such as is known and sold under the trademark Torlon™ is used to provide the electrical isolation for the electrical/hydraulic terminal connectors 128. An electrically conductive tube 226 is positioned within the homing isolation sheath 220, and provides the electrical and hydraulic coupling to the conductors 152. Preferably, this coupling is accomplished by brazing the conductor 152 within the tube 226. The electrical coupling to the external source of electrical energy (not shown) is provided by securing a phase lead 228 on the terminal connector 128 with a nut 230. As the nut 230 is tightened, the phase lead 228 is forced against an electrically conductive base piece 224. This base piece is preferably brazed into the robe 226 as shown in FIG. 7. In a highly preferred embodiment, the nut 230 is self locking.

Figure 8:
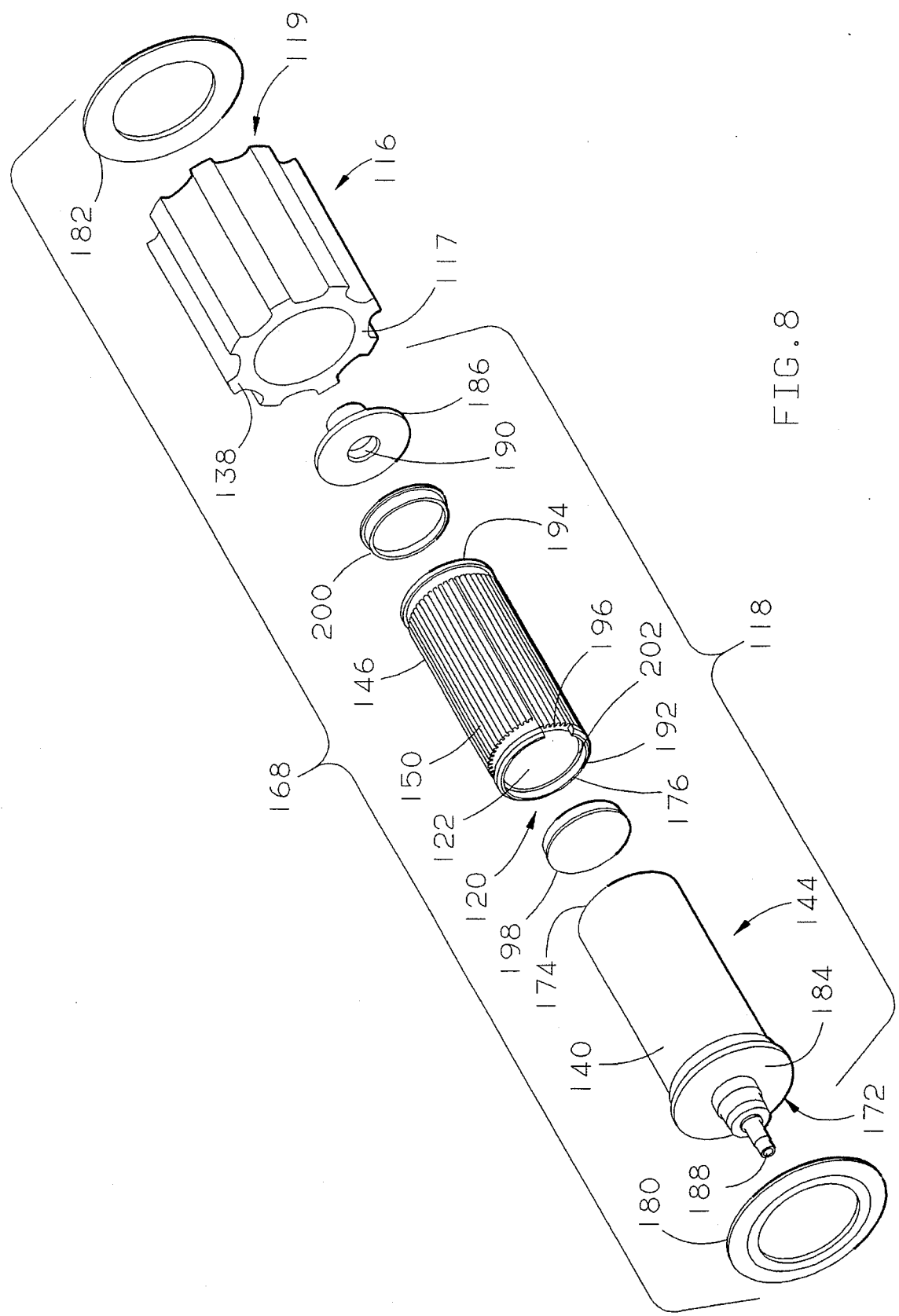
FIG. 8 is an exploded view of the rotor assembly of the instant invention.

As shown in FIG. 8, the rotor assembly 168 comprises a hollow shaft assembly 118 which is made up of an outer sleeve 144 which has a first and a second axial end 172 and 174, an outer periphery 140 and an inner periphery 148. An inner cooling sleeve 142 having a first 176 and a second 178 axial ends and an outer periphery 146 and an inner periphery 122 defining an interior void 120 is secured within the outer sleeve 144. In a preferred embodiment, the inner cooling sleeve 142 is press fit into the outer sleeve 144, although brazing would also be acceptable. The outer periphery 146 of the inner cooling sleeve 142 defines a plurality of cooling channels 150 between the inner periphery 148 of the outer sleeve 144 and the outer periphery 146 of the inner cooling sleeve 142. A rotor core 116 having a plurality of salient poles 138 is press fit on the outer periphery 140 of the outer sleeve 144. Additionally first 180 and second 182 end plates are mounted on each axial end 117, 119 of the rotor core 116. The hollow shaft assembly 118 further comprises shaft end riggs 184 and 186 which are fixably attached to each axial end 172 and 174 of the outer sleeve 144. These end riggs 184 and 186 define coolant flow orifices 188 and 190 therein for communicating coolant to the plurality of cooling channels 150 of the shaft assembly 118.

The inner cooling sleeve 142 of the preferred embodiment of the instant invention comprises first and second 192, 194 sealing lips at each axial end 176, 178 of the inner cooling sleeve 142. Each of these sealing lips 192, 194 define a coolant flow opening 196 for communicating coolant from the coolant flow orifices 188, 190 to the cooling channels 150. These sealing lips 192, 194 abut the shaft end fittings 184, 186 and form a fluid seal. Additionally, first and second end caps 198, 200 axe seated on an axially inner ridge 202 at each axial end 176, 178 of the inner cooling sleeve 142. These end caps 198, 200 provide a fluid seal to prevent coolant from entering the interior void 120 which is defined by the inner periphery 122 of the inner cooling sleeve 142. The end caps 198, 200 further direct coolant from the cooling flow orifices 188, 190 through the coolant flow opening 196, and into the cooling channels 150.

Figure 9:
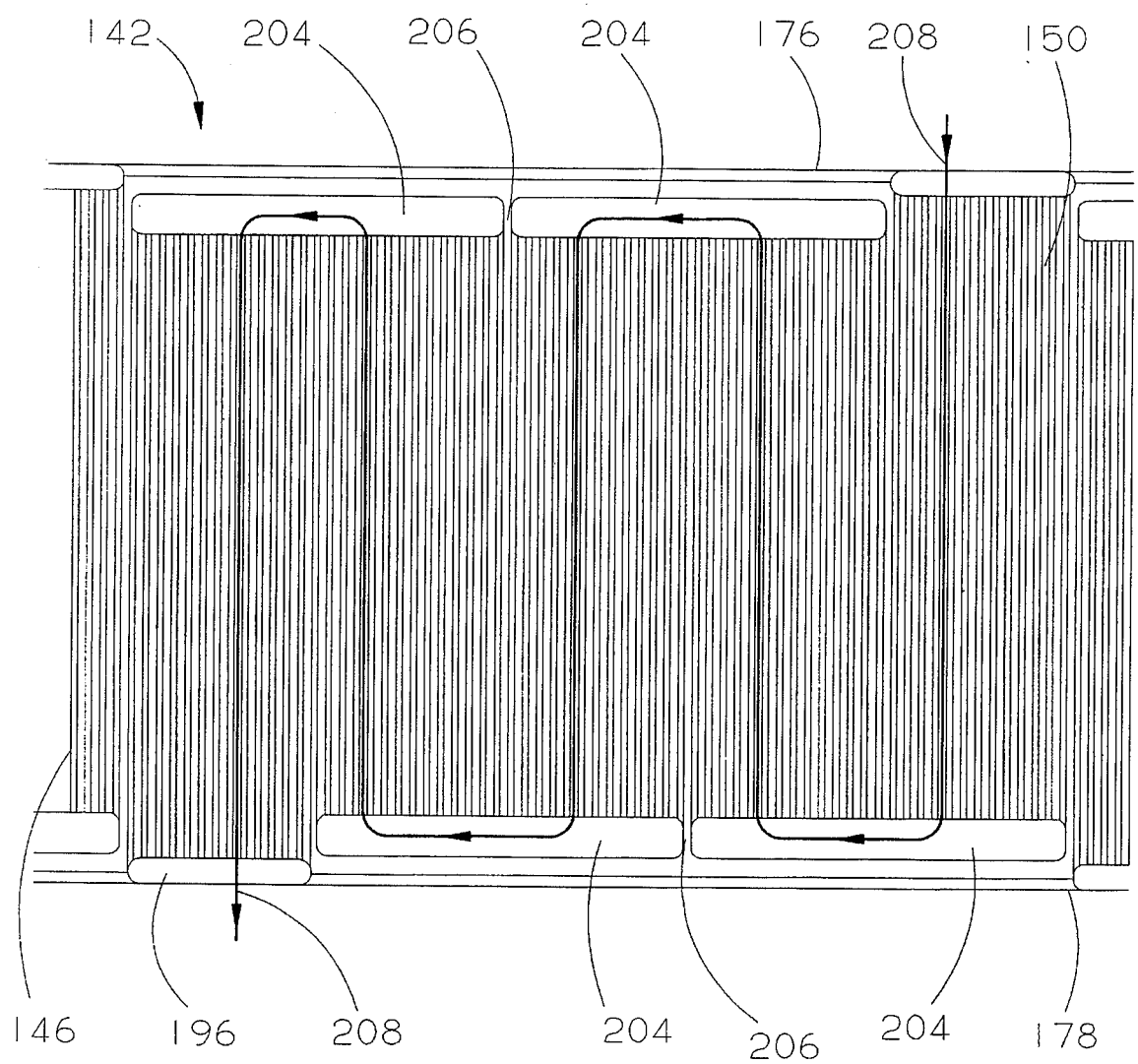
FIG. 9 illustrates the cooling channel arrangement of the rotor inner cooling sleeve of the instant invention.

As shown in greater detail in FIG. 9, the outer periphery 146 of the inner cooling sleeve 142 defines a plurality of manifolds 204 formed at each axial end 176, 178 of the inner cooling sleeve 142 for channeling coolant circumferentially along the outer periphery 146 of the inner cooling sleeve 142. Manifold separators 206 formed on the outer periphery 146 of the inner coolant sleeve 142 abut the shaft end flags 184, 186 (see FIG. 8) and form a fluid seal at each axial end 176, 178 of the cooling sleeve 142. The manifold separators 206 formed at a first axial end 176 of the cooling sleeve 142 axe circumferentially offset from the manifold separators 206 formed at the second axial end of 178 of the cooling sleeve 142 so as to define a coolant flow path 208 which axially traverses the outer periphery 146 of the inner cooling sleeve 142 in a first axial direction through a first portion of the cooling channels 150 to one of the end manifolds 204, therein circumferentially traversing a portion of the outer periphery 146 of the inner cooling sleeve 142 until reaching one of the manifold separators 206 whereat the coolant flow path 208 axially traverses the outer periphery 146 of the inner cooling sleeve 142 in a second axial direction through a second portion of the cooling channels 150. In this way, very little coolant is actually required to cool the rotor assembly 168. Unlike the method of cooling the hollow core shaft of MacMinn, for example, the interior void 120 is kept empty thereby reducing the mount of oil required, reducing the total system weight, and increasing the cooling efficiency. This cooling efficiency increase is aided by an increase in the coolant's Reyolds number which increases the thermal coefficient of heat transfer.

Figure 10:
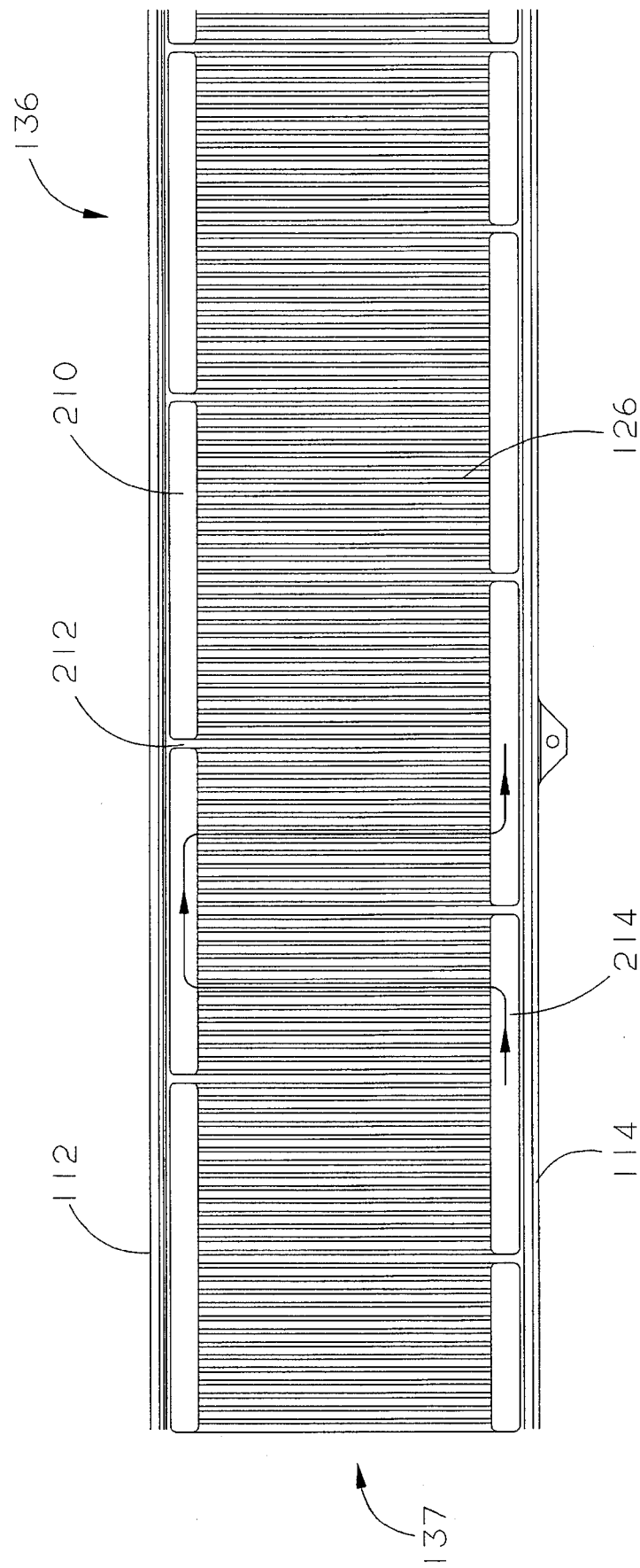
FIG. 10 illustrates the cooling channel arrangement of the stator cooling sleeve of the instant invention.

Further, in accordance with the preferred embodiment of the instant invention, FIG. 10 illustrates the stator cooing sleeve 136 in greater detail. As shown therein, the stator cooling sleeve 136 defines stator end manifolds 210 at each axial end 112, 114 of the stator cooling sleeve 136 circumferentially around the outer periphery 137 of the stator cooling sleeve 136. The end manifolds 210 are separated by stator end manifold separators 212 formed by the stator cooling sleeve 136. These stator end manifold separators 212 at the first axial end 112 of the stator 102 are circumferentially offset from the stator end manifold separators 212 formed at the second axial end 114 of the stator 102 so as to define a coolant flow path 214 which axially traverses the outer periphery 137 of the stator cooling sleeve 136 in a first axial direction through a first portion of the cooling channels 126 to one of the stator end manifolds 210, therein circumferentially traversing a portion of the outer periphery of the stator cooling sleeve 136 until reaching one of the stator end gold separators 212, whereat the coolant flow path 214 axially traverses the outer periphery 137 of the stator cooling sleeve 136 in a second axial direction through a second portion of the cooling channels 126.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. An electrical/hydraulic terminal connector for providing isolated electrical and hydraulic coupling from an external source of electrical energy and an external source of hydraulic cooling fluid through a generator housing to a set of hollow core conductors, comprising:

a housing isolation sheath penetrating the housing;

an electrically conductive tube positioned within said isolation sheath and coupled to the hollow core conductors for directing the hydraulic cooling fluid to the hollow core conductors, said tube further providing electrical coupling to the
   hollow core conductors;

an electrically conductive hollow base piece coupled to said tube, said base piece providing electrical coupling from the external source of electrical energy by receiving a phase lead thereon, said base piece further directing hydraulic cooling fluid to said tube; and an insulative coupling nose cone coupled to said base, said nose cone providing electrically isolated coupling from the external source of hydraulic cooling, said nose cone further directing hydraulic cooling fluid to said base piece.

2. The electrical/hydraulic terminal connector of claim 1, further comprising an isolation collar positioned on said isolation sheath for securing the electrical/hydraulic terminal connector through the housing.

3. The electrical/hydraulic terminal connector of claim 1, further comprising a nut threadably attached to said base plate for securing the phase lead against said base plate.

* * * * *